US 7,486,860 B2

(12) United States Patent
Bell et al.

(10) Patent No.: US 7,486,860 B2
(45) Date of Patent: Feb. 3, 2009

(54) MULTI-DWELLING UNIT OPTICAL FIBER SPLITTING UNIT

(75) Inventors: George N. Bell, Stormville, NY (US); Richard D. Pinsonneault, Jackson, NJ (US); John L. Carey, Jr., Haymarket, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/619,480

(22) Filed: Jan. 3, 2007

(65) Prior Publication Data

US 2008/0159740 A1 Jul. 3, 2008

(51) Int. Cl.
*G02B 6/26* (2006.01)
(52) U.S. Cl. .............................. 385/48; 385/15; 385/39; 385/140
(58) Field of Classification Search ................... 385/15, 385/39, 48, 140
See application file for complete search history.

(56) References Cited

U.S. PATENT DOCUMENTS

| 5,432,875 | A | * | 7/1995 | Korkowski et al. | ............ 385/27 |
| 5,767,755 | A | * | 6/1998 | Kim et al. | ................... 333/101 |
| 5,818,389 | A | * | 10/1998 | Lazar | ......................... 342/383 |
| 6,285,252 | B1 | * | 9/2001 | Huang | ........................ 330/149 |

* cited by examiner

*Primary Examiner*—Jennifer Doan

(57) ABSTRACT

A multiple dwelling unit (MDU) optical fiber splitting unit (FBU). One or more fiber strands enters the FBU at the MDU. Each strand may be connected to a variable attenuator. Each strand is subject to a one to four split. Each of the four split fibers is connected to an optical connection interface such as an SC/ACP connector. Each optical output is connected to an MDU-ONT that supplies an optical interface to copper and cable infrastructure, enabling fiber-based services to be provided to units in an MDU with reduced installation costs and utilization of existing twisted pair and coaxial distribution lines.

11 Claims, 3 Drawing Sheets

Optical outs to Individual ONTs in MDU

PRIOR ART

MULTI-DWELLING UNIT OPTICAL FIBER SPLITTING UNIT

BACKGROUND INFORMATION

Telecommunication providers (Telcos) have made significant investments in fiber infrastructure in order to deliver fiber-based services to their customers. The migration to fiber gives Telcos an advantage over copper-based DSL because of the signal is not as vulnerable to near and far end cross talk interface, and line length proportional attenuation. Also, much higher data rates may be achieved than over copper. This is also an advantage over cable providers who have moved into the telecommunication space and are now providing phone and high speed internet services over cable. Optical fiber promises to deliver phone, television and data services at rates simply not possible with cable.

A major limiting factor in providing fiber-to-the-premises (FTTP) services is implementation cost. In addition to burying fiber lines or stringing them on poles, there is a relatively high cost in delivering fiber the last 10, 20, 40 or 100 feet to the customer's premises, whether that is a business or residence. Multiple dwelling units (MDUs) are more cost effective than widely distributed neighborhoods to implement optical-based services because of the close proximity of units. In MDU implementations, one or more fiber lines are usually split at a box at the MDU with individual fiber lines terminating at a termination unit at each customer's unit. Despite the high density of potential customers, the equipment costs are significant. Thus, it would be desirable to provide optical network service to subscribers in an MDU that reduces the implementation cost to the Telco.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for delivering optical fiber-based services from a Telco central office to end users in a multi-dwelling unit. It should be appreciated, however, that the present disclosure is not limited to these specific embodiments and details, which are exemplary only. It is further understood that one possessing ordinary skill in the art, in light of known systems and methods, would appreciate the use of the inventions for its intended purposes and benefits in any number of alternative embodiments, depending upon specific design and other needs.

Figure 1:
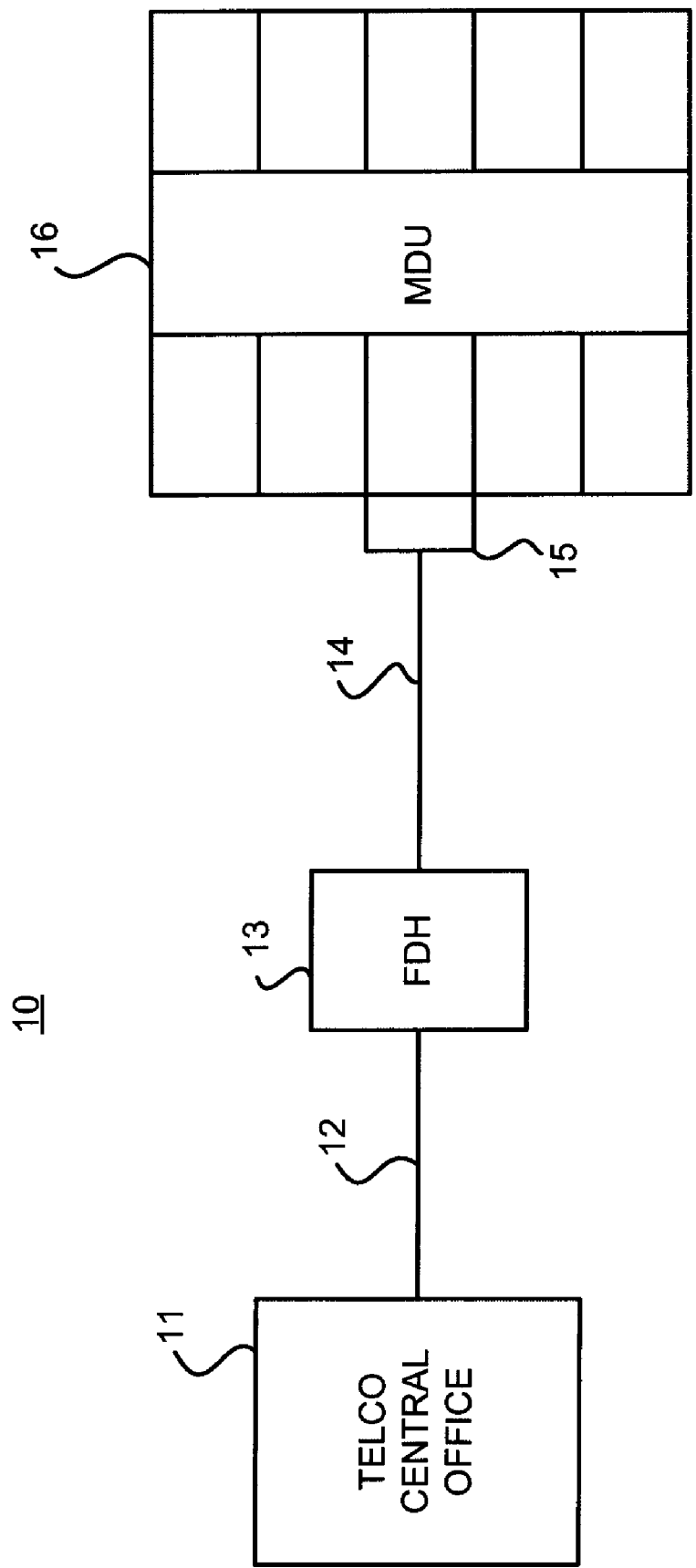
FIG. 1 is an exemplary network architecture of an optical fiber network interconnecting a Telco central office with a plurality of end users in a multi-dwelling unit.

FIG. 1 is an exemplary network architecture of an optical fiber network interconnecting a Telco central office with a plurality of end users in a multi-dwelling unit. The network 10 includes a Telco central office 11 that provides optical service to a variety of residential, and business customers, and connects these customers to wide area network services such as the Internet, public switched telephone networks (PSTNs), or other networks.

The network 10 may also include an optical fiber connection from the central office (CO) 11 to a fiber distribution hub (FDH) 13 via fiber cable 12. The FDH may serve as the primary interface between feeder cables such as cable 12 extending from the CO to distribution fibers routed to subscribers. The hub may include a physical enclosure through which technicians can route connections to complete subscriber circuits, such as circuit 14-16 in FIG. 1.

The exemplary system may also include a distribution line 14 that may comprise one or more strands of optical fiber depending on the number of units to be serviced. A fiber distribution terminal 15 at the service end point, such as multiple dwelling unit 16 The fiber distribution terminal (FDT) 15 may be located in a closet, enclosure or other structure and may provide a physical interface to the distribution lines in the MDU 16 that provide service to the individual units.

Providing service to MDUs has been a revenue maximizing strategy for Telcos that provide optical fiber-based communication services, because only a single buried or pole-strung line can support multiple customers at a single location, such as, for example, an apartment/condominium building, a townhouse community, or other multi-family structure.

Figure 2:
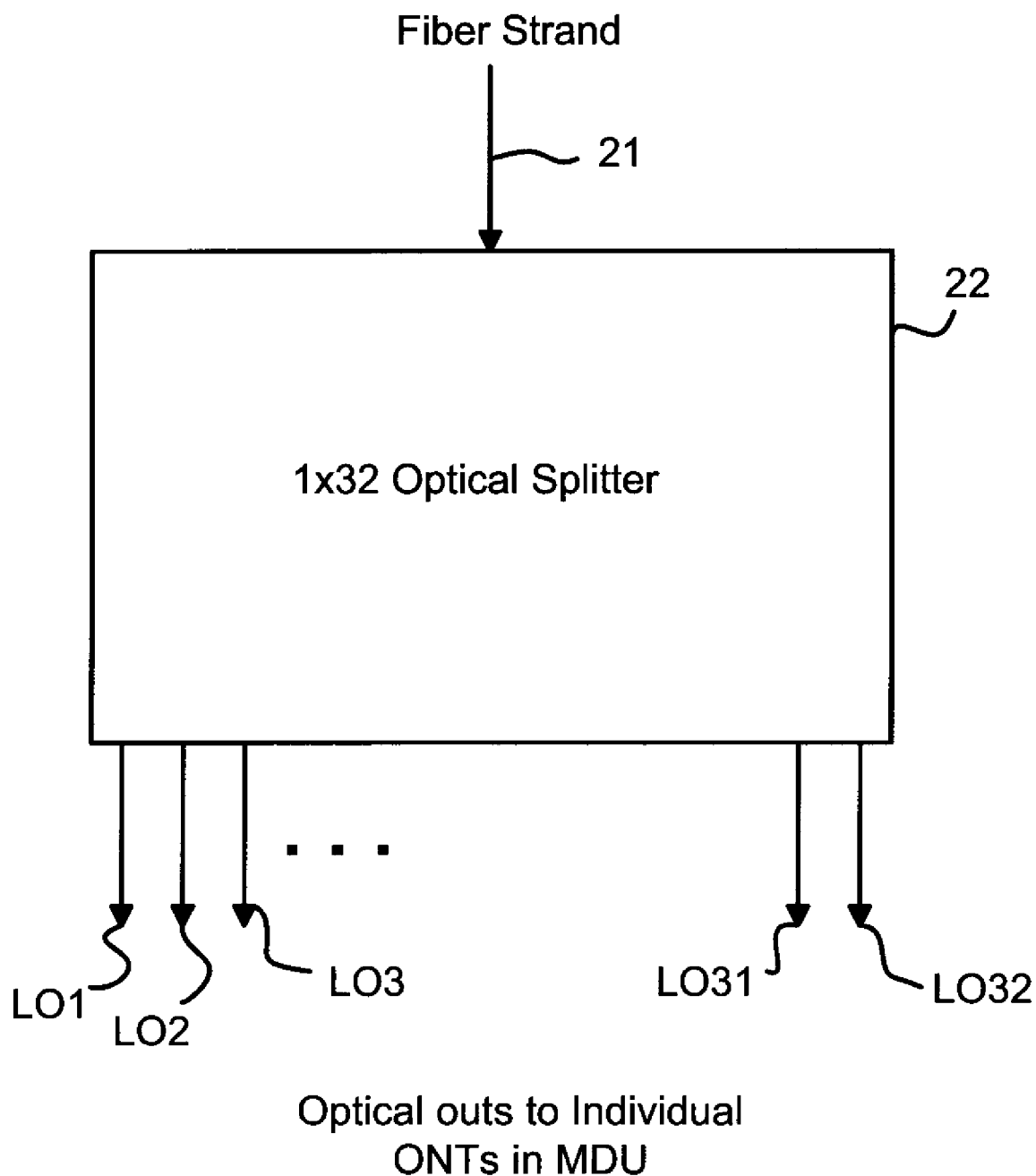
FIG. 2 is an exemplary conventional splitting unit for providing an optical connection to a plurality of end users in a multi-dwelling unit.

FIG. 2 is an exemplary conventional splitting unit for providing an optical connection to a plurality of end users in a multi-dwelling unit. In the exemplary architecture of FIG. 2, a single fiber strand 21 enters the splitting unit 22 where it is split into either 16 or 32 individual fiber strands. Each of the individual fiber strands are then connected to the ONT equipment at each customer's unit. A shortcoming of this architecture is the hardware costs in having all the individual optical connections as well as the splitter itself. With individual optical ports costing between $35 and $40, the ports alone can make the cost of this splitter in excess of $1000 to provide service to 32 customers. Each of the optical line outputs, LO1, LO2, LO3, . . . , LO31, and LO32 are optical outputs that are routed to each customers' termination equipment in the MDU. Therefore the conventional splitting unit 22 is able to interconnect 32 customers to ONT equipment at the CO.

Figure 3:
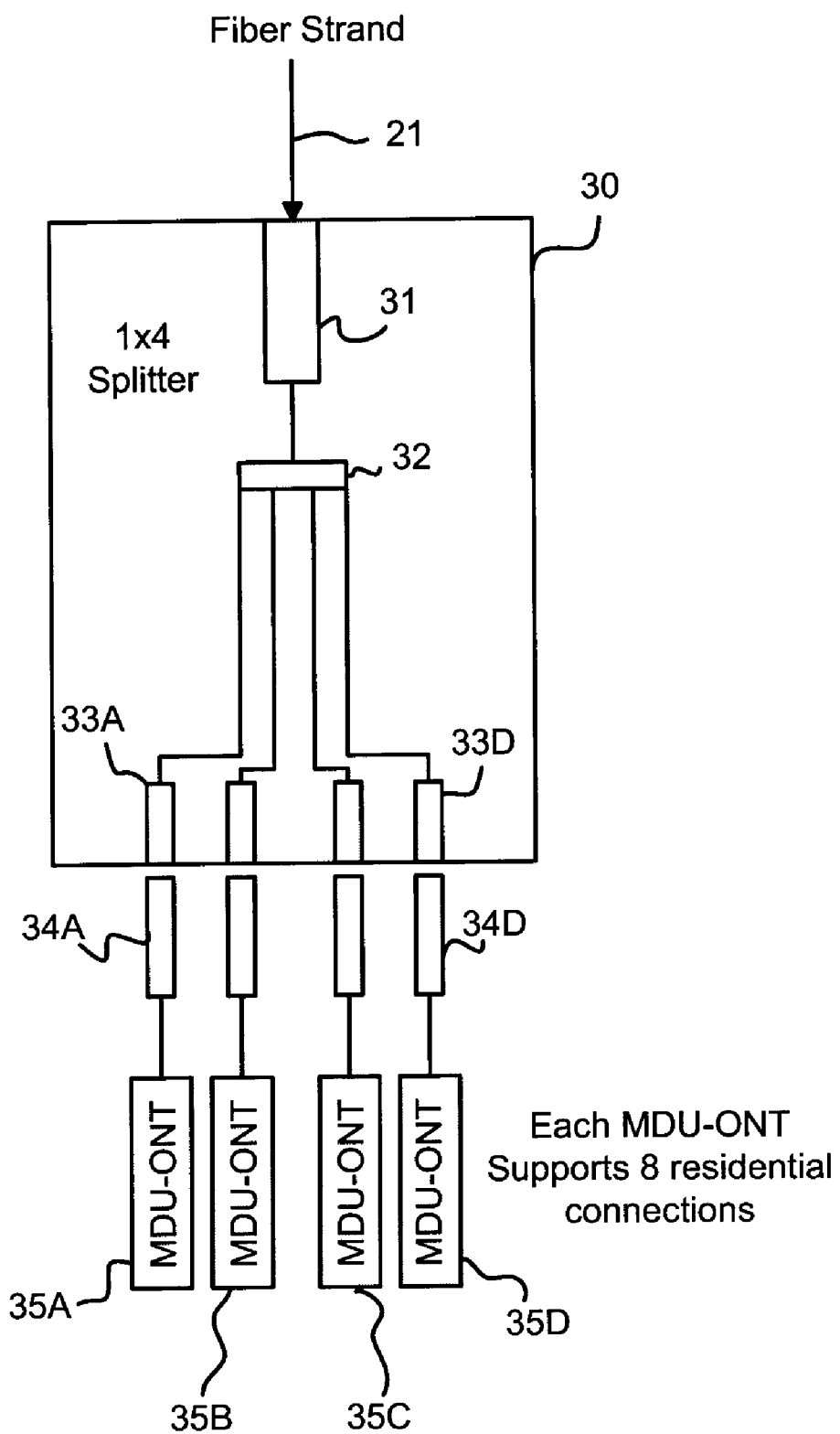
FIG. 3 is schematic diagram of an optical fiber splitting unit for a multi-dwelling unit in accordance with at least one embodiment of the disclosure.

FIG. 3 is schematic diagram of an optical fiber splitting unit for a multi-dwelling unit in accordance with at least one embodiment of the disclosure. Like the splitting unit 22 of FIG. 2, the splitting unit 30 of FIG. 3 may receive a single fiber strand 21 as an input. The fiber strand may enter the splitting unit 30 through an opening or may interface with an optical connector as is known. Inside the splitting unit 30, the fiber strand 21 may encounter a line attenuator such as a variable attenuator 31. The attenuator 31 may in various embodiments provide between 9 dB and 10 dB of attenuation. The attenuator 31 may be any commercially available optical attenuator as are well known. The splitter 30 may also comprise a 1×4 splitter 32 that splits the single strand 21 into four individual optical strands. Any commercially available splitter may be utilized. The splitter itself may provide between 5 and 7 dB of attenuation for a total line attenuation of between 14-17 dB.

Each of the optical strands may be connected to a corresponding optical port 33A, 33B, 33C, and 33D. These ports may receive standard optical connectors such as SC or SC/APC (SC angled physical contact) connectors 34A, 34B, 34C, and 34D. Each of the four connectors 34A, 34B, 34C and 34D may provide an optical connection to respective MDU-ONT devices. In various embodiments, rather than having an ONT at each customer location, an MDU-ONT may service a plurality, such as eight, individual end users. Thus, rather than 32 optical interfaces, only 4 optical interfaces may be required.

The MDU-ONT itself may interface with customer units in the MDU by taking advantage of existing twisted pair and coaxial cable connections. For example, the MDU-ONT may connect to the existing copper infrastructure in the MDU running to each customer unit to provide phone and data services. The MDU may also contain one or more video output ports for providing a coaxial or other video type interface to existing video cables in the MDU servicing each customer unit. In this way, additional path creation in the MDU from the MDU-ONT is unnecessary. This may reduce costs associated with installation of fiber-based services in the MDU.

Thus, a key feature of the various embodiments of the disclosure is that the cost or providing fiber-to-the-premises (FTTP) is reduced significantly by a reduction in hardware costs. Various embodiments, may service the same number of customers as conventional splitters, for example 32, interface without any changes and the CO, using only four optical interfaces instead of 32. This may reduce the size requirements for implementation relative to conventional FDTs.

Another key feature is that the MDU-ONT may allow the services provider the ability to reuse the embedded copper base within the MDU structure, for example, if the MDU-ONT is placed in a common location where the service provider can access the existing copper network and provide the services. The ability to reuse the existing copper network in the MDU reduces the need for additional path creation in the MDU and reduces disruption to the tenants. Also, the MDU-ONT may include one or more video output ports that connects to the existing coaxial cable distribution lines running to each unit and may also provide a copper interface for the POTS and Data services.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than a restrictive sense.

The invention claimed is:

1. A modular enclosure comprising:
    an optical fiber input that receives an optical fiber;
    at least one optical attenuator connected to the optical fiber input;
    a 1×4 splitter that splits the optical fiber input into four optical lines; and
    four connection interfaces that interface with four optical line components that each provide fiber-based services individual dwelling units of a multiple dwelling unit (MDU) structure.

2. The modular enclosure according to claim 1, wherein the four optical line components comprise MDU optical network termination units (ONTs).

3. The modular enclosure according to claim 2, wherein each MDU-ONT supports 8 dwelling units.

4. The modular enclosure according to claim 3, wherein each MDU-ONT comprises at least 8 twisted pair copper interface connectors that connect to copper wiring running to each of the 8 dwelling units.

5. The modular enclosure according to claim 3, wherein each MDU-ONT comprises at least one video output ports for routing video services to each dwelling unit via existing video cables running to each dwelling unit.

6. The modular enclosure according to claim 1, wherein the at least one optical attenuator comprises an variable attenuator providing approximately 9 dB to 10 dB of power attenuation.

7. The modular enclosure according to claim 1, wherein the four connection interfaces comprise four SC fiber connection interfaces.

8. An apparatus comprising:
    a housing;
    an input in the housing that receives at least one optical fiber strand;
    a line attenuator in the housing coupled to the at least one optical fiber strand that attenuates a power level of optical signals transmitted over the fiber strand;
    a splitter that splits the fiber strand into four individual optical fiber strands; and
    four optical fiber connectors that connect to four external fiber lines via four multiple dwelling unit optical network terminals (MDU-ONTs), wherein each MDU-ONT provides connection services to eight dwelling units of an MDU.

9. The apparatus according to claim 8, wherein each MDU-ONT comprises eight twisted pair copper connectors adapted to connect to copper lines running to each unit of the MDU.

10. The apparatus according to claim 8, wherein each MDU-ONT comprises at least one video output ports for routing video services to each dwelling unit via existing video cables running to each dwelling unit.

11. A method comprising:
    providing at least one optical fiber strand-based connection from a provider's central office to a multiple dwelling unit (MDU) fiber splitting unit;
    connecting the at least one fiber strand to a line attenuator in the fiber splitting unit;
    for each at least one fiber strand, splitting the strand into four fiber strands with a 1×4 splitter in the fiber splitting unit;
    connecting each of the four fiber strands to an optical connector integral to the fiber splitting unit;
    connecting a multiple dwelling unit optical network terminal (MDU-ONT) to each optical connector, wherein each MDU-ONT supplies fiber-optic based plain old telephone service (POTS), data and video service to eight units of an MDU using non-fiber interface connection to each unit from the MDU-ONT.

* * * * *